(12) United States Patent
Pai

(10) Patent No.: US 10,878,020 B2
(45) Date of Patent: Dec. 29, 2020

(54) AUTOMATED EXTRACTION TOOLS AND THEIR USE IN SOCIAL CONTENT TAGGING SYSTEMS

(71) Applicant: Nikhil Pai, New York, NY (US)

(72) Inventor: Nikhil Pai, New York, NY (US)

(73) Assignee: Hootsuite Media Inc., Vancouver (CA)

( * ) Notice: Subject to any disclaimer, the term of this patent is extended or adjusted under 35 U.S.C. 154(b) by 83 days.

(21) Appl. No.: 15/692,059

(22) Filed: Aug. 31, 2017

(65) Prior Publication Data

US 2018/0217986 A1    Aug. 2, 2018

Related U.S. Application Data

(60) Provisional application No. 62/451,135, filed on Jan. 27, 2017.

(51) Int. Cl.
*G06F 16/00* (2019.01)
*G06F 16/435* (2019.01)
(Continued)

(52) U.S. Cl.
CPC .......... *G06F 16/435* (2019.01); *G06F 16/434* (2019.01); *G06F 16/438* (2019.01); *G06F 16/9535* (2019.01)

(58) Field of Classification Search
CPC ............. G06F 11/1474; G06F 11/1662; G06F 11/1469; G06F 16/9024; G06F 16/00; G06F 17/30; G06F 17/30958; G06F 2201/835; G06F 9/466; G06F 11/1084; G06F 11/0727; G06F 11/0778; G06F 11/3006; G06F 21/6227; G06F 16/58; G06F 17/271; G06F 17/21; G06F 17/27; G06F 17/30082; G06F 17/30008; G06F 17/30286; G06F 16/435; G06F 16/434; G06F 16/438; G06F 16/9535; G06F 17/30752; G06F 17/30277; G06F 17/30029; G06F 17/3005; G06F 17/30867;
(Continued)

(56) References Cited

U.S. PATENT DOCUMENTS 6,651,097 B1 * 11/2003 Maruyama ............... G09B 5/14
709/223
8,826,347 B1 * 9/2014 Earle ................. H04N 21/4825
725/109
(Continued)

OTHER PUBLICATIONS

"Automatic Tag Extraction from social media for visual Labeling"—Shuhua Liu & Thomas Forss—Published in: 2015 7th International Joint Conference on Knowledge Discovery, Knowledge Engineering and Knowledge Management (IC3K) Date of Conference: Nov. 12-14, 2015 Date IEEE Xplore: Aug. 1, 2016 pp. 504-510 (1-7).*

*Primary Examiner* — Anh Ly
(74) *Attorney, Agent, or Firm* — JWIP & Patent Services, LLC; Jacob G. Weintraub, Esq.

(57) ABSTRACT

The present invention relates to novel methods, tools and systems that provide for true automatic tagging of social content that overcome the deficiencies of existing techniques, and their requirement of static tag creation. In particular, the present invention relates to automated extraction tools and their use in creating tags through automated analysis of social media content, and further using the created tags in systems to associate the tag with the original content, e.g., based on user settings.

22 Claims, 4 Drawing Sheets

(51) Int. Cl.
*G06F 16/438* (2019.01)
*G06F 16/9535* (2019.01)
*G06F 16/432* (2019.01)

(58) Field of Classification Search
CPC ......... G06F 19/00; H04L 43/12; H04L 67/10; H04L 12/16; G06Q 30/201
See application file for complete search history.

(56) References Cited

U.S. PATENT DOCUMENTS

| | | | | |
|---|---|---|---|---|
| 2005/0108630 | A1* | 5/2005 | Wasson | G06F 16/313 715/230 |
| 2006/0153439 | A1* | 7/2006 | Moriya | G01N 21/95684 382/147 |
| 2007/0130112 | A1* | 6/2007 | Lin | G06F 16/41 707/E17.009 |
| 2008/0189265 | A1* | 8/2008 | Taranov | G06F 16/36 |
| 2009/0164490 | A1* | 6/2009 | Wininger | G06Q 10/06 |
| 2009/0300712 | A1* | 12/2009 | Kaufmann | G06F 21/335 726/1 |
| 2010/0290699 | A1* | 11/2010 | Adam | G06K 9/6217 382/155 |
| 2013/0031469 | A1* | 1/2013 | Yoshizaka | G06F 16/9535 715/239 |
| 2013/0219179 | A1* | 8/2013 | Pizano | H04L 9/3231 713/168 |
| 2014/0074728 | A1* | 3/2014 | Margulies | G06Q 30/01 705/304 |
| 2014/0195921 | A1* | 7/2014 | Grosz | G06F 3/1242 715/738 |
| 2014/0198213 | A1* | 7/2014 | Liken | B60Q 1/2603 348/148 |
| 2014/0304815 | A1* | 10/2014 | Maeda | G06F 11/3604 726/22 |
| 2014/0337413 | A1* | 11/2014 | Kamma | H04L 67/06 709/203 |
| 2015/0012987 | A1* | 1/2015 | Tian | H04L 63/0815 726/6 |
| 2015/0032675 | A1* | 1/2015 | Huehn | G06Q 50/01 706/12 |
| 2015/0095303 | A1* | 4/2015 | Sonmez | G06N 5/003 707/707 |
| 2015/0106078 | A1* | 4/2015 | Chang | G06F 16/35 704/9 |
| 2015/0106156 | A1* | 4/2015 | Chang | G06Q 30/0201 705/7.29 |
| 2015/0106157 | A1* | 4/2015 | Chang | G06Q 30/0201 705/7.29 |
| 2016/0173937 | A1* | 6/2016 | Shih | H04N 21/43615 725/37 |
| 2016/0328789 | A1* | 11/2016 | Grosz | H04N 1/00161 |
| 2017/0195356 | A1* | 7/2017 | Turgeman | H04L 63/1425 |
| 2017/0330220 | A1* | 11/2017 | Korada | G06F 16/24578 |

* cited by examiner

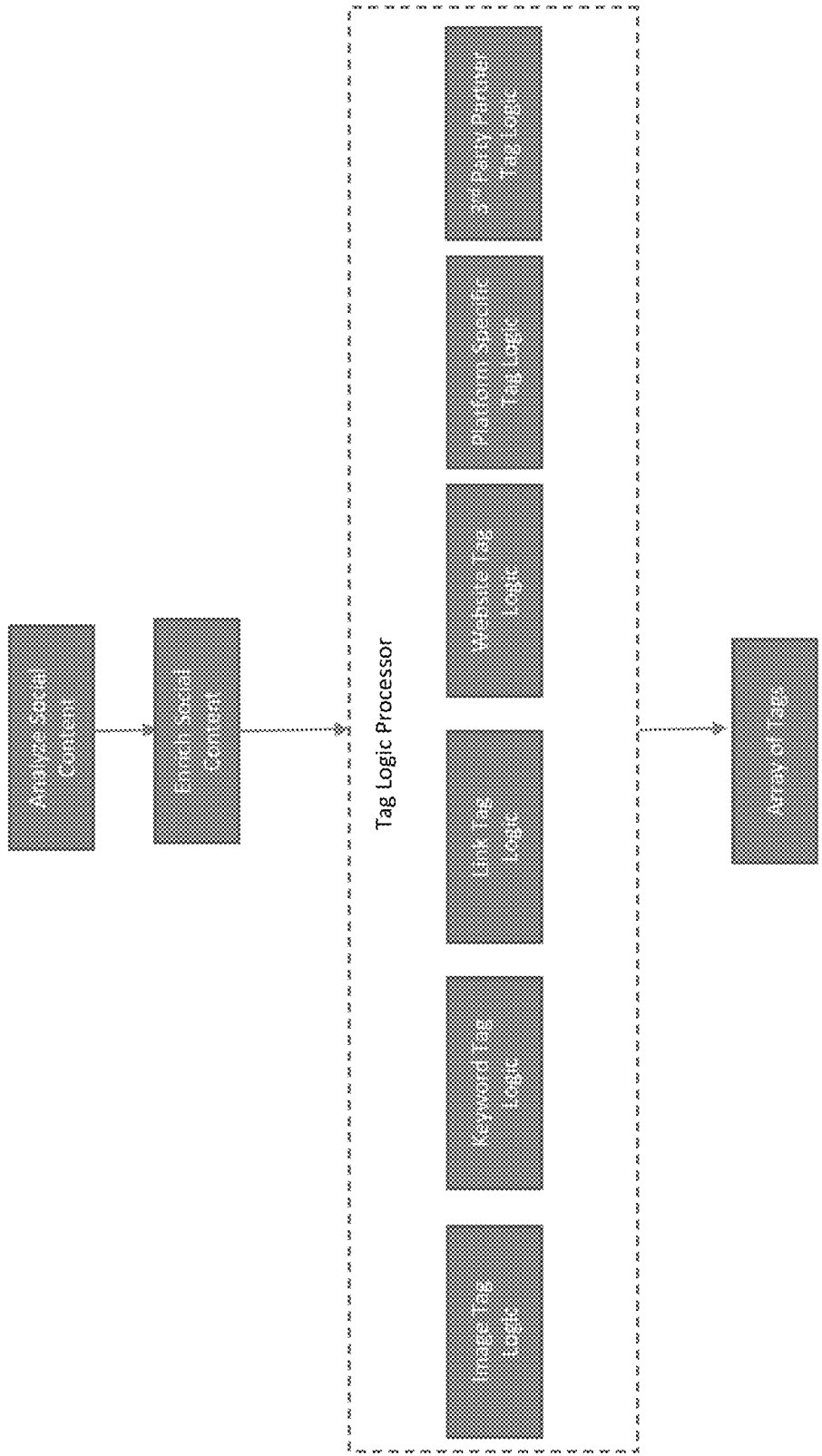

10,878,020 B2

AUTOMATED EXTRACTION TOOLS AND THEIR USE IN SOCIAL CONTENT TAGGING SYSTEMS

RELATED APPLICATIONS

This application claims the benefit of priority from U.S. Provisional Patent Application No. 62/451,135, filed on Jan. 27, 2017, the entirety of which is incorporated herein by reference.

BACKGROUND OF THE INVENTION

In information systems, a tag is a non-hierarchical keyword or term assigned to a piece of information (such as an Internet bookmark, digital image, or computer file). This kind of metadata helps describe an item, allows it to be found again by browsing or searching, and enables aggregation of data around this metadata. Tags are generally chosen informally and personally by the item's creator or by its viewer, depending on the system.

Currently, social content managers are required to manually add relevant tags when they post social media content to aggregate metrics around specific content themes and campaigns. Most social media marketing tools that provide publishing functionality enable a customer to manually add tags within their interface. For example, a social community manager at a News Outlet may tag a post with the article section and article author so that they can later get data on which article sections generate the most of a single metric. The process of manually adding tags is time consuming when companies publish numerous posts per social network a day.

Although there have been some automatic tagging mechanisms, these mechanism have leveraged keyword analysis. This type of "automatic" tagging requires the user to create a list of static tags that are of interest in the content before tagging of the content can occur. As such, this type of mechanism has scalability issues.

Accordingly, there is significant need for additional tools and systems that provide for true automatic tagging of social content that overcomes these deficiencies.

SUMMARY OF THE INVENTION

Accordingly, the present invention is directed to methods, novel tools and systems that provide for true automatic tagging of social content that overcome the deficiencies of existing techniques, and their requirement of static tag creation. In particular, the present invention relates to automated extraction tools and their use in creating tags through automated analysis of social media content, and further using the created tags in systems to associate the tag with the original content, e.g., based on user settings.

As such, one aspect of the present invention provides an automated extraction tool comprising a machine-readable medium having instructions stored thereon for execution by a processor to perform a method comprising the steps of: analyzing social content using a set of automation logic parameters (ALP) to identify metadata content for one or more tags; extracting the identified metadata; and creating one or more tags from the extracted metadata using tag conversion rules, such that one or more tags is automatically created based on the identified metadata.

Another aspect of the present invention provides a system for automated social content tagging comprising an automated extraction tool of the present invention, and a fourth machine-readable medium having instructions stored thereon for execution by a processor to perform a method comprising the step of: associating one or more tags obtained from the automated extraction tool with the original analyzed social content.

In another aspect, the present invention provides a method of automatically creating tags from social content comprising the steps of: analyzing social content using a set of automation logic parameters (ALP) to identify metadata content for one or more tags; extracting the identified metadata; and creating one or more tags from the extracted metadata using tag conversion rules, such that one or more tags is automatically created based on the identified metadata.

BRIEF DESCRIPTION OF THE DRAWINGS

Advantages of the present apparatus will be apparent from the following detailed description, which description should be considered in combination with the accompanying drawings, which are not intended limit the scope of the invention in any way.

FIG. 4 is a flowchart depicting the operational steps of an automated extraction tool within the computer system environment of FIG. 1 for detecting and extracting tags, in accordance with one embodiment of the present invention.

DETAILED DESCRIPTION OF THE INVENTION

Figure 1:
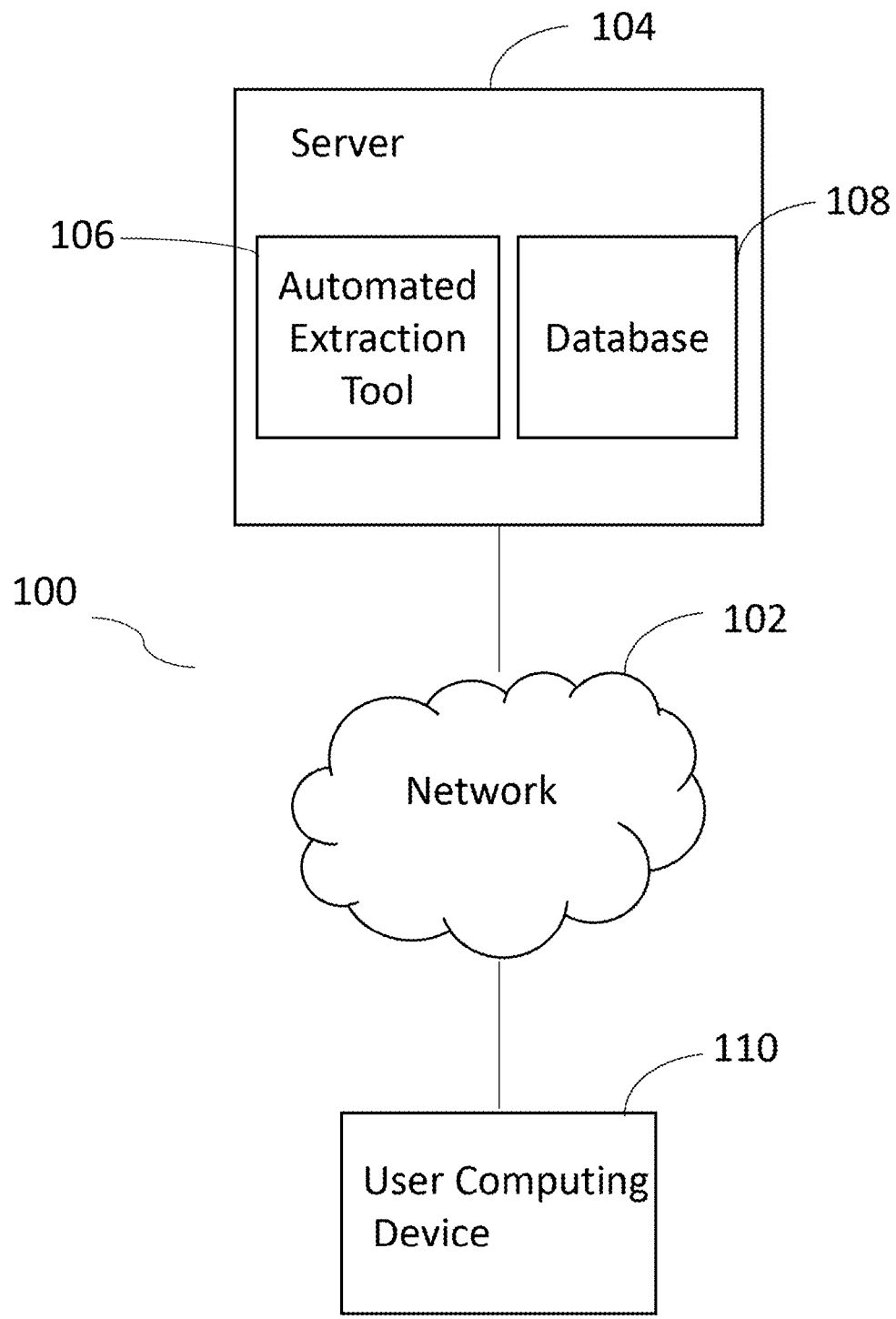
FIG. 1 depicts a block diagram of a computing system environment, in accordance with one embodiment of the present invention.

The manual process of tagging social content is not scalable, and as such, prevents accurate/precise reporting as well as prevents insight into the return on investment (ROI) of their paid, earned and owned social campaigns. In this way, removing the manual process of tagging and enabling our customers to plug in to the wealth of data that exists in the shadows of social content provides immeasurable benefits, and a better understanding of what elements of content drive performance, and provide a method for A/B testing; giving them tangible insight.

The present invention is capable of adding meaningful metadata to social content and ads in a scalable way that can then be used for better reporting and to extract insights. In particular, rules-based mechanisms may be used to extract relevant metadata from a social post or social ad and then provide another rules-based mechanism to use that relevant metadata to add tags. As an additional advantage of using the present invention versus the other solutions is that the present invention adds more unique metadata to the social post or content that then can be combined with rules-based logic to convert into tags.

In particular, the present invention is directed to methods, novel tools and systems that provide for true automatic tagging of social content that overcome the deficiencies of existing techniques, and their requirement of static tag creation. In particular, the present invention relates to automated extraction tools and their use in creating tags through automated analysis of social media content, and further using the created tags in systems to associate the tag with the original content for later data analytics, e.g., based on user settings.

The present methods, tools and systems automatically assign contextual tags using customizable rules, e.g., defined by each user, e.g., customer. Moreover, in certain embodiments, these methods, tools and systems have the ability utilize natural language processing (NLP), image recognition, and website crawlers on a single social post to produce a wealth of data that can be used for advanced segmentation as well as insight into their social analytics, performance, and ROI.

The present invention, including systems, tools, and related methods will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The term "automatic" or "automatically" are used herein to describe a process that is automated. Automated processes do not contain steps that require a human operator to perform the steps.

The language "entity extraction" is art-recognized, and describes a subtask of information extraction that seeks to locate and classify a named entity in text into a pre-defined category such as the names of persons, organizations, locations, expressions of times, quantities, monetary values, percentages, etc. providing annotation of the entity information, i.e., greater detail for the named entity.

The term "extraction" or "extracting" is art-recognized, and is used herein with reference to metadata to describe the capture and storage of data for immediate or later accessibility. In certain embodiments, the storage is organized in an array format, e.g., a tag array.

The term "interface" is art-recognized, and is used herein to describe a shared boundary across which two or more separate interfacing components are enabled to exchange information, which can be, for example, between: software components, computer hardware components, peripheral device components, humans and combinations of thereof. Moreover, the operation of these separate components across the boundary, as in the transmission of information from the source social content to the machine-readable medium for analysis to identify metadata content, is referred to herein as "interfacing." In certain embodiments, the interfacing may be bi-directional. In other embodiments, the interfacing may be uni-directional. In specific embodiments, the term "interface" may be a user interface, e.g., a graphic user interface.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Machine-readable medium of the present invention are non-transitory, and therefore do not include signals per se, i.e., are directed only to hardware storage medium. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network. In a particular embodiment, the machine-readable medium is a network server disk, e.g., an internet server disk, e.g., a disk array. In specific embodiments, the machine-readable medium is more than one network server disks.

The term "metadata" is art-recognized, and describes data (information) that provides information about other data, including descriptive metadata, structural metadata, and administrative metadata. Descriptive metadata describes a resource for purposes such as discovery and identification, including but not limited to elements such as title, abstract, author, and keywords. Structural metadata is metadata about containers of data and indicates how compound objects are put together, for example, how pages are ordered to form chapters; describing the types, versions, relationships and other characteristics of digital materials. Administrative metadata provides information to help manage a resource, such as when and how it was created, file type and other technical information, as well as who can access it.

The language "social content" is used as a short-hand for "social media content," which is art-recognized. This includes content and link sharing on various social media platforms.

The term "storing" is art-recognized, and is used herein to describe the act of saving data on a machine readable medium in a manner that such data is subsequently retrievable on that machine readable medium.

The term "tag" is art-recognized, and is used to describe a keyword or term assignable to a piece of information/data (such as an internet link, digital image, database record, text, or computer file). This kind of metadata helps describe an item and allows it to be found again by searching. Such tag may then be specifically associated with that information/data or used in establishing metric analysis of the content.

The term "user" is used herein to describe any person that interfaces with the tools and systems of the present invention described herein through electronic means, e.g., computer or mobile device. Such user, in certain embodiments, may be an administrator that is maintaining and/or customizing the tools or systems, or the related automation logic parameters or tag conversion rules.

II. Methods of the Invention

One embodiment of the present invention, provides a method of automatically creating tags from social content comprising the steps of:
  analyzing social content using a set of automation logic parameters (ALP) to identify metadata content for one or more tags;
  extracting the identified metadata; and
  creating one or more tags from the extracted metadata, e.g., an array of tags, using tag conversion rules,
such that one or more tags is automatically created based on the identified metadata. In certain embodiments, the social content is selected from the group consisting of a URL destination, a link, an image, text, and any combination thereof.

In certain embodiments of the invention, the method further comprises the step of collecting the social content to analyze.

Automated logic parameters are pre-defined rules that are used to analyze social content automatically once defined and applied to the social content. In certain embodiments of the invention, the automation logic parameters includes a filtering parameter, e.g., one or more filtering parameters. In certain embodiments of the invention, the automatic logic parameters are capable of modification, e.g., by a user, e.g., providing personalized ALP. For example, such modification may be achieved through a user interface, e.g., a graphic user interface.

The automation logic parameters of the methods of the present invention are defined by rules adopted for analysis of images, keywords, links, websites, platform specific information, and/or third party partners:

A. Automation Logic Parameters

Images

Automation logic parameters for images focus on analyzing a link to an image, e.g., by sending it to a third-party service that analyzes the image, and delivers an array of metadata that describe the image for extraction as tags. In another embodiment, automated extraction tool of the invention analyzes images and searches for matches to specific keywords. In particular embodiments, entity extraction may be part of the automation logic parameters. In certain embodiments, the automated extraction tool uses image recognition to extract the tags. In certain embodiments, the automated extraction tool uses text or predetermined features of the image(s) to extract tags.

Keyword

Automation logic parameters for keywords focus on analyzing the content within the source document for predetermined metadata based on descriptions, messages, names, etc. In certain embodiments, the automated extraction tool analyzes text and searches for matches to specific keywords. In particular embodiments, entity extraction may be part of the automation logic parameters.

Links

Automation logic parameters for links focus analyzing the content in the URL and a predetermined number of the linked URL and extracting predetermined metadata. In certain embodiments, the automated extraction tool analyzes the links and searches for matches to specific keywords. In particular embodiments, entity extraction may be part of the automation logic parameters. In certain embodiments, the automated extraction tool defines a predetermined area of a link (subdomain, utm parameters, content sections, etc.) to extract metadata from. Examples of this step are automatically extracting and subsequently associating the tag created to a blog (tagging) by searching for a subdomain that matches the keyword blog, and automatically tagging a whitepaper by doing a string search of the entire url for the word whitepaper.

Website

Automation logic parameters for websites focus on analyzing the HTML on the links contained within the metadata of the content to extract keywords from defined elements. Example includes the list of keywords from the keyword metadata element within the Website HTML. In certain embodiments, the automated extraction tool uses web crawlers to extract textual tags. For example, in particular embodiments, specific portions of a website html code may be designated for extraction of metadata. For example, if there is <og type="author" title="john smith">, the automation logic parameters may be used to automatically analyze, extract and create a tag for everything in the title area. This allows a site that may have hundreds of authors to automatically pull out the author of all links on posts or ads to which they drive content.

Platform Specific Information

Automation logic parameters for platform specific information focuses on analyzing the metadata of the content for data that is specific to a social network (e.g. story element for Facebook or hashtags for twitter). These platforms may be, but are not limited to specific programming languages, operating systems, document file formats or the like.

Third Party Partner

Automation logic parameters for third party partners focuses on connecting to third party vendor or partner where their social content is already tagged and then searching for the corresponding metadata based on the metadata of the content. This can be any amount of code or sections of code that are provided by third party vendors or partners. In certain embodiments, content based on third party servers and databases is generated. In certain embodiments, third party tags are ads, web analytics, widget integration, social media integration, conversion tracking, live chat, or the like. The format the third party tags, such as JavaScript or the like can be separated out and used to create various types of third party extracted metadata and corresponding tags.

In certain embodiments of the invention, the method further comprises the step of presenting an array of tags, e.g., in a user friendly manner.

In certain embodiments of the invention, the method further comprises the step of storing the extracted metadata on a second machine-readable medium. In certain embodiments, the first and second machine readable medium are the same.

In certain embodiments of the invention, the method further comprises the step of storing on or more of the created tags on a third machine-readable medium. In certain embodiments, the first and third machine readable medium are the same. In certain embodiments, the first, second, and third machine readable medium are the same.

In certain embodiments of the invention, the automation logic parameters includes the step of normalization and enrichment of the social content, e.g., including natural language processing.

In certain embodiments of the invention, the method further comprises interfacing with a user, e.g., a user of a tool or system of the present invention.

In certain embodiments of the invention, the tag conversion rules for creating tags are capable of modification, e.g., by a user, e.g., providing personalized tag conversion rules. For example, such modification may be achieved through a user interface, e.g., a graphic user interface.

In certain embodiments of the invention, the method is iteratively performed, e.g., to account for updating social content, e.g., wherein modification of the ALP or tag conversion rules may be made before any iteration.

Once the tags have been created the information may be structured for the end user. In certain embodiments of the invention, the method further comprises the step of presenting an array of tags, e.g., in a user friendly manner. In a particular embodiment, the information is presented to the user in an array format to allow easy access and review of the information. The information may be presented in various formats such as JavaScript Object Notation (JSON), Extensible Markup Language (XML) or the like.

In certain embodiments of the invention, the method further comprises the step of associating one or more tags with the original analyzed social content. In certain embodiments, the automated extraction tool takes all the tags and associates them with predetermined sections of the original content. This can be connecting the tags with the images, URLs, or content to keep all the content and tags in order so a user reading/reviewing the content can see where the tag was originated from. In additional embodiments, the automated extraction tool places all the tags in a predetermined location such as, the beginning of the content or the end of the content.

Another embodiment is a method for extracting tags automatically from content, comprising:
  receiving, from one or more processors, a set of logic parameters to use in conjunction with an original content;
  executing, from one or more processors, a url destination tag logic;
  executing, from one or more processors, a link tag logic;
  executing, from one or more processors, an image tag logic;
  executing, from one or more processors, a textual tag logic;
  creating, from one or more processors, a plurality of tags; and
  associating, from one or more processors, the plurality of tags with the original content.

In certain embodiments of the interfacing tools of the present invention, the method further comprises presenting a user interface (e.g., a graphical user interface (GUI)) to a user that is designed to facilitate certain actions selected from the group consisting of analyzing social content using a set of automation logic parameters (ALP) to identify metadata content for one or more tags; extracting the identified metadata; and creating one or more tags from the extracted metadata using tag conversion rules. In particular embodiments, the method further comprises interfacing with the user interface by the user. In particular further embodiments, the method comprises storing said metadata or created tags on a server (e.g., capable of access or modification).

In certain embodiments, the methods of the present invention may be embodied as a tool or a system.

III. Tools of the Invention

The methods of the present invention are useful as instructions stored on a machine-readable medium for execution by a processor to perform the method. In certain embodiments, the methods and tools of the present invention also make use and/or comprise a processor. Accordingly, any methods of the present invention, alone or in combination with other methods (such as those described herein or elsewhere) may be stored on a machine-readable medium for execution by a processor to perform the method. Such a composition comprises an automated extraction tool of the invention, e.g., as part of a system for automated social content tagging.

Another embodiment of the present invention provides an automated extraction tool comprising a machine-readable medium having instructions stored thereon for execution by a processor to perform a method comprising the steps of:
  analyzing social content using a set of automation logic parameters (ALP) to identify metadata content for one or more tags;
  extracting the identified metadata; and
  creating one or more tags from the extracted metadata, e.g., an array of tags, using tag conversion rules, such that one or more tags is automatically created based on the identified metadata. In certain embodiments, the social content is selected from the group consisting of a URL destination, a link, an image, text, and any combination thereof.

In certain embodiments of the automated extraction tools of the present invention, the method further comprises the step of collecting the social content to analyze.

In certain embodiments of the automated extraction tools of the present invention, the automation logic parameters includes a filtering parameter, e.g., one or more filtering parameters.

In certain embodiments of the automated extraction tools of the present invention, the automatic logic parameters are capable of modification, e.g., by a user, e.g., providing personalized ALP. For example, such modification may be achieved through a user interface, e.g., a graphic user interface.

In certain embodiments of the automated extraction tools of the present invention, the tag conversion rules for creating tags are capable of modification, e.g., by a user, e.g., providing personalized tag conversion rules. For example, such modification may be achieved through a user interface, e.g., a graphic user interface.

In certain embodiments of the automated extraction tools of the present invention, the method further comprises the step of presenting an array of tags, e.g., in a user friendly manner.

In certain embodiments of the automated extraction tools of the present invention, the method further comprises the step of storing the extracted metadata on a second machine-readable medium. In certain embodiments, the first and second machine readable medium are the same.

In certain embodiments of the automated extraction tools of the present invention, the method further comprises the step of storing on or more of the created tags on a third machine-readable medium. In certain embodiments, the first and third machine readable medium are the same. In certain embodiments, the first, second, and third machine readable medium are the same.

In certain embodiments of the automated extraction tools of the present invention, the method is iteratively performed, e.g., to account for updating social content, e.g., wherein modification of the ALP or tag conversion rules may be made before any iteration.

In certain embodiments of the automated extraction tools of the present invention, the automation logic parameters includes the step of normalization and enrichment of the social content, e.g., including natural language processing For example, in one embodiment, the automated extraction tool is presented with social posts, and social ads on which the automated tag creation process is performed. The metadata is extracted from the social posts and social ads. This metadata may be selected from, for example, but is not limited to all links, images, hashtags, and predetermined information such as branded content or videos that are set by the user. The extracted metadata from the posts and ads may then be enriched through normalization and/or entity extraction to provide a more useable and readable set of data from the metadata. The tag conversion rules are then applied to the enriched data, e.g., wherein the tag conversion rules are set to only trigger on specific social networks or URLs. The tags are directly created from the extracted metadata, the enriched metadata, link structure, and through partner processes, e.g., such as image recognition software of any images which were extracted or enriched by a partner process. The tags are created either directly as the automated extraction tool is operating, or may be the result of modification to create even more refined set of tags, e.g., characterizing the tag by placement in one or more tag "buckets" selected from content, campaign, tone, objective, or other tag bucket.

The machine-readable storage medium can be a tangible device that can retain and store instructions for use by an instruction execution device. The machine-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

In certain embodiments of the automated extraction tools of the present invention, the machine-readable medium is selected from the group consisting of magnetic media, punched cards, paper tapes, optical disks, barcodes, magnetic ink characters, and solid state devices. In certain embodiments, the machine-readable medium is one or more network server disks.

In certain embodiments of the automated extraction tools of the present invention, the machine-readable medium is online software. In a particular embodiment, the software is an online application. In particular embodiments, the software is a web-based application. In an alternative particular embodiment, the software is a cloud-based application. Moreover, the interfacing tool may be a web application accessible in an Internet browser, desktop software running on Windows, Mac OS, Linux (or any other operating system), or a mobile application (available on smart devices, e.g., smartphones, or tablets) In particular embodiments, the communication interface is a cloud based interface, e.g., based on iOS or Android platforms.

The method may be executable as program code, and such code may execute entirely on a user's computer, partly on the user's computer, as a stand-alone software package, partly on the user's computer and partly on a remote computer or entirely on a remote computer or server. In one embodiment, a remote computer may be connected to the operator's computer through any type of network, including a local area network (LAN) or a wide area network (WAN), or the connection may be made to an external computer (for example, through the Internet using an Internet Service Provider).

Machine-readable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives machine-readable program instructions from the network and forwards the machine-readable program instructions for storage in a machine-readable storage medium within the respective computing/processing device.

Machine-readable instructions for carrying out operations/instructions/methods of the present invention may be assembled instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the machine-readable program instructions by utilizing state information of the machine-readable instructions to personalize the electronic circuitry, in order to perform aspects of the present invention.

IV. Systems of the Invention

The automated extraction tools of the present invention, described herein, may be incorporated into systems, which also comprise a machine-readable medium for associating the tags obtained from the automated extraction tool with the original analyzed social content.

As such, another embodiment of the present invention provides a system for automated social content tagging comprising
    an automated extraction tool of the present invention, and
    a fourth machine-readable medium having instructions stored thereon for execution by a processor to perform a method comprising the step of: associating one or more tags obtained from the automated extraction tool with the original analyzed social content.

In certain embodiments, the first and fourth machine readable medium are the same. In certain embodiments, the first, second, and fourth machine readable medium are the same. In certain embodiments, the first, second, third, and fourth machine readable medium are the same.

In certain embodiments, the systems of the present invention may be used to analyze metrics, e.g., related to return on investment (ROI).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by machine-readable instructions.

These machine-readable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The machine-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

EXEMPLIFICATION

Having thus described the invention in general terms, reference will now be made to the accompanying drawings of exemplary embodiments, which are not necessarily drawn to scale, and which are not intended to be limiting in any way.

In this respect, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The flowchart and block diagrams in the Figures illustrate the architecture, functionality, and operation of possible implementations of systems, methods, and tools according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes network 102, server 104, and computing device 110. As depicted, computing environment 100 provides an environment for automated extraction tool 106 and database 108 to access content created on user computing device 110 through network 102. Computing environment 100 may include additional servers, computers, or other devices not shown.

Network 102 may be a local area network (LAN), a wide area network (WAN) such as the Internet, any combination thereof, or any combination of connections and protocols that can support communications between server 104 and computing device 110 in accordance with embodiments of the invention. Network 102 may include wired, wireless, or fiber optic connections.

Server 104 may be a management server, a web server, or any other electronic device or computing system capable of processing program instructions and receiving and sending data. In certain embodiments, server 104 may be a laptop computer, tablet computer, netbook computer, personal computer (PC), a desktop computer, or any programmable electronic device capable of communicating with computing device 110 via network 102. In other embodiments, server 104 may represent a server computing system utilizing multiple computers as a server system, such as in a cloud computing environment. In another embodiment, server 104 represents a computing system utilizing clustered computers and components to act as a single pool of seamless resources. In certain embodiments, the creator of the content may provide all the potential options on server 104. In the depicted embodiment, server 104 includes automated extraction tool 106 and database 106. In certain other embodiments, server 104 may include any combination of automated extraction tool 106 and database 106.

Automated extraction tool 106 operates to analyze content and extract a predetermined type of tag from the content. Automated extraction tool 106 analyzes the website destination content, image content, link content, and textual content, and extracts tags from this content based on user set parameters. In the depicted embodiment, automated extraction tool 106 resides on server 104 with database 108 and utilizes network 102 to user computing device 110 to access the content. In one embodiment, automated extraction tool 106 resides on computing device 110. In other embodiments, automated extraction tool 106 may be located on another server or computing device, provided automated extraction tool 106 has access to database 106 and user computing device 110.

Database 106 may be a repository that may be written to and/or read by automated extraction tool 106. Information gathered from automated extraction tool 106 may be stored to database 106 as well as any analysis techniques, metadata, and additional data that automated extraction tool 106 can use to analyze, extract, create, and associate tags with content. In one embodiment, database 106 is a database management system (DBMS) used to allow the definition, creation, querying, update, and administration of a database(s). In the depicted embodiment, database 106 resides on server 104. In other embodiments, database 106 resides on another server, or another computing device, if database 106 is accessible to automated extraction tool 106.

Computing device 110 may be a management server, a web server, or any other electronic device or computing system capable of processing program instructions and receiving and sending data. In certain embodiments, computing device 110 may be a laptop computer, tablet computer, netbook computer, personal computer (PC), a desktop computer, or any programmable electronic device capable of communicating with server 106 via network 102. In other embodiments, computing device 110 may represent a server computing system utilizing multiple computers as a server system, such as in a cloud computing environment. In another embodiment, computing device 110 represents a computing system utilizing clustered computers and components to act as a single pool of seamless resources. In the depicted embodiment, computing device 110 communicates with automated extraction tool 106 via network 102. In other embodiments, computing device 110 may include any combination of automated extraction tool 106 and database 106.

Figure 2:
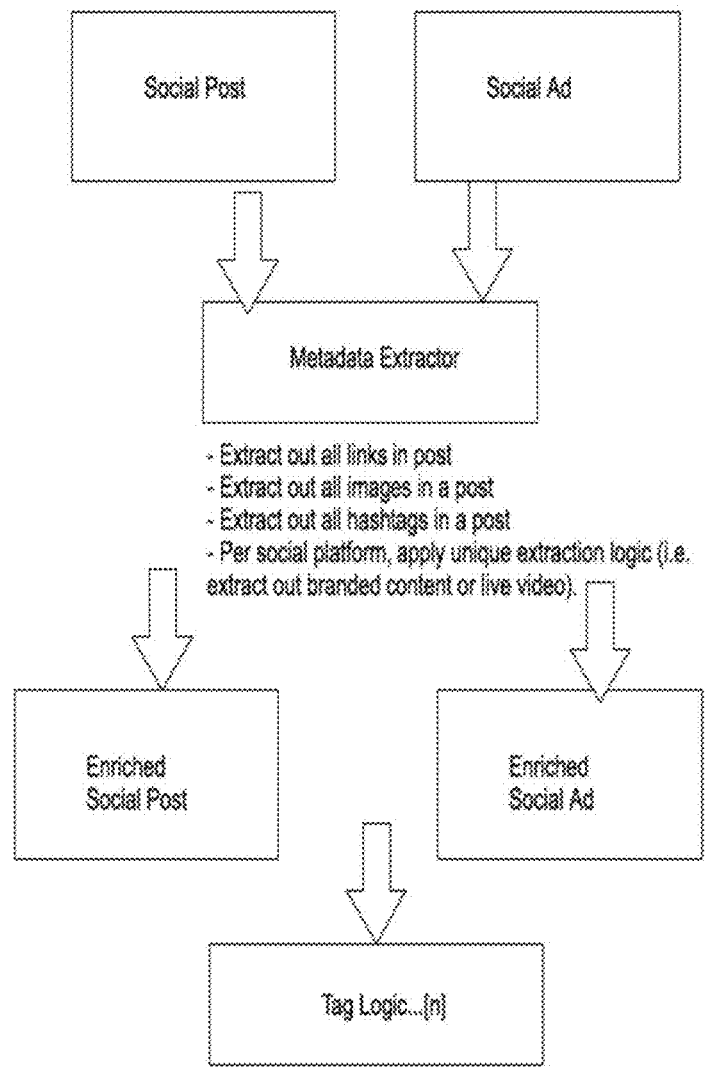
FIG. 2 is a flowchart depicting operational steps of a system for automated social content tagging within the computer system environment of FIG. 1 for detecting and extracting tags, in accordance with one embodiment of the present invention.

FIG. 2 depicts flowchart 200 of automated extraction tool 106 executing within computing environment 100 of FIG. 1, in accordance with an embodiment of the present invention. Process 200 represents the process of automated extraction tool 106 in a system for automated social content tagging, analyzing, extracting, creating, and then associating tags in content. As depicted in FIG. 2, process 200 depicts steps performed by automated extraction tool 106 in a system for automated social content tagging and may include additional steps not shown.

Automated extraction tool 106 receives the automated logic parameters. In certain embodiments, the user sets forth which social content they want the automated extraction tool 106 to analyze. For example, this can be content based on destination Uniform Resource Locator (URL), content based on a link URL, an image URL, or text within the content. The user can further adjust/modify many additional features of the automated extraction tool 106, including, but not limited to how to extract metadata from links, images, website destination URL, content, metadata from social content and can also customize how to turn that metadata into tags via the tag conversion rules (example: keyword or automatic). Example: 1) Automatically tag any hashtags in a post into tags vs. 2) If the word Trump is used in the text, then tag with Election 2016.

Automated extraction tool 106 executes the destination URL automation logic parameter analysis. The automated extraction tool 106 focuses on pulling content from the destination URL and then analyzing this content for potential metadata from which tags may be created. For example: pulling the <meta name=keyword>tags from a website, or searching an entire website contents for the word "Add to Cart." In additional embodiments, the automated extraction tool 106 uses predefined sections within a websites code to turn into tags.

Automated extraction tool 106 executes link automation logic parameter analysis. Automated extraction tool 106 focuses on analyzing the content in the link URL and extracting predetermined metadata from which tags may be created. In one embodiment, automated extraction tool 106 defines a predetermined area of a link (subdomain, utm parameters, content sections, etc.) to extract metadata from and subsequently creating a tag therefrom. Examples of this step are automatically creating a tag for a blog by searching for a subdomain that matches the keyword blog, and automatically creating a tag for a whitepaper by doing a string search of the entire url for the word whitepaper.

Automated extraction tool 106 executes image automation logic parameter analysis. Automated extraction tool 106 focuses on images in the predetermined content to extract metadata from which tags may be created from the image. In one embodiment, automated extraction tool 106 uses image recognition to extract the metadata from which tags may be created from the image. In another embodiment, automated extraction tool 106 uses text or predetermined features of the image(s) to extract metadata.

Automated extraction tool 106 executes text automation logic parameter analysis. Automated extraction tool 106 focuses on analyzing the content within the source document for predetermined metadata from which tags may be created based on descriptions, messages, names, etc. In another embodiment, automated extraction tool 106 analyzes text and searches for matches to specific keywords. In particular embodiments, entity extraction may be part of the automation logic parameters. In another embodiment, automated extraction tool 106 can use web crawlers to extract textual tags. For example, a user can designate specific portions of their website html code from which data can be extracted. For example, if there is <og type="author" title="john smith">, automated extraction tool 106 can automatically tag everything in the title area. This allows a site that may have hundreds of authors to automatically pull out the author of all links on posts or ads that they drive content to.

Automated extraction tool 106 creates the tags. In certain embodiments, automated extraction tool 106 takes all the tags and creates specific tags for a predetermined number of the tags collected. In certain embodiments, automated extraction tool 106 removes all duplicate tags. In alternative embodiments, automated extraction tool 106 keeps all duplicate tags.

A system for automated social content tagging comprising automated extraction tool 106 associates the tags. The system for automated social content tagging takes all the tags from automated extraction tool 106 and associates them with predetermined sections of the original content. This can be connecting the tags with the images, URLs, or content to keep all the content and tags in order so a user reading/reviewing the content can see where the tag was originated from. In additional embodiments, the system places all the tags in a predetermined location such as, the beginning of the content or the end of the content.

Figure 3:
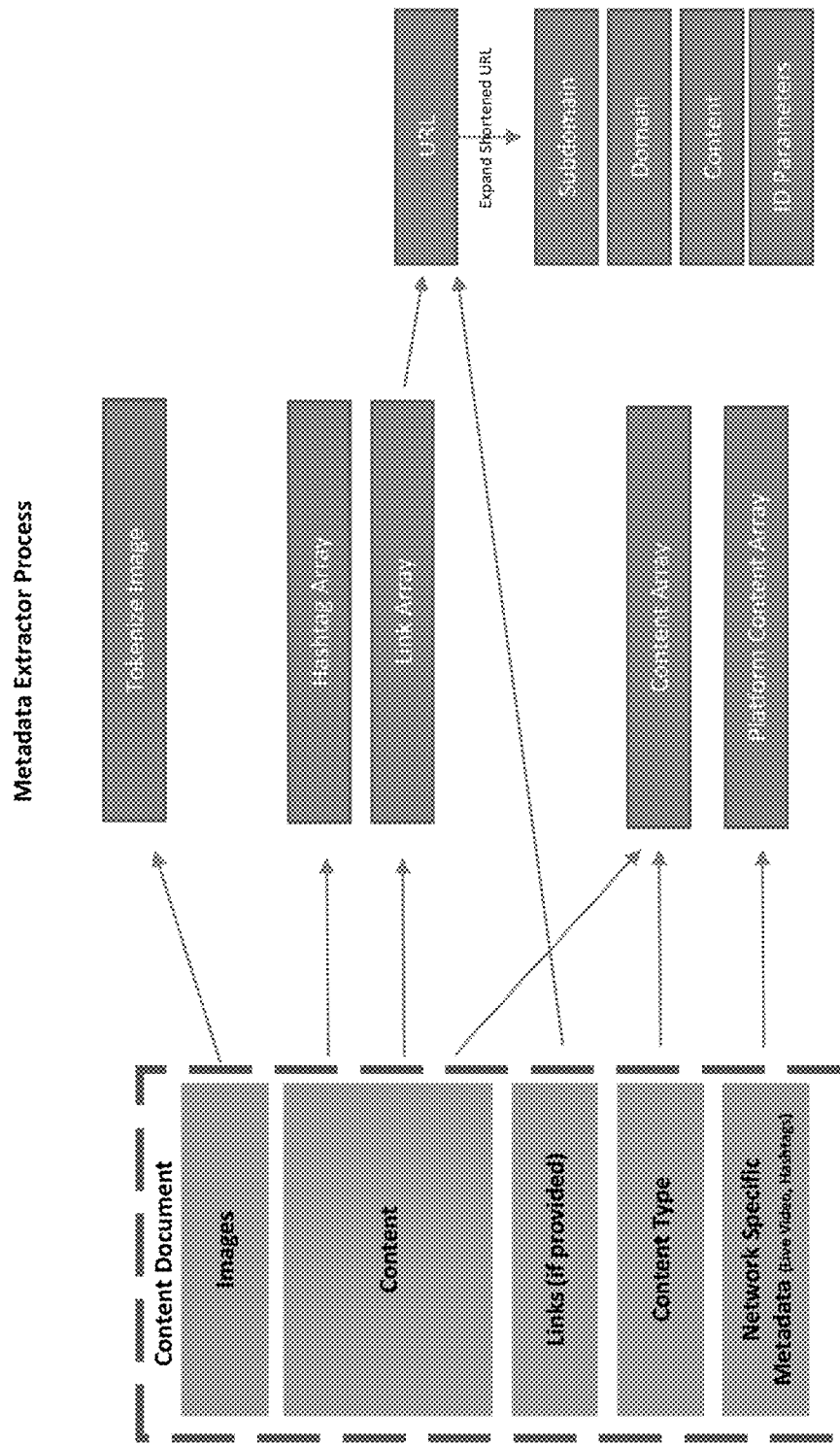
FIG. 3 is a flowchart depicting operational steps of an automated extraction tool within the computer system environment of FIG. 1 for detecting and extracting tags, in accordance with one embodiment of the present invention.

FIG. 3 depicts flowchart 300 of automated extraction tool 106 executing within computing environment 100 of FIG. 1, in accordance with an embodiment of the present invention. Process 300 represents the process of automated extraction tool 106 analyzing the social content, the enrichment process, the tag creation process, and the presentation of the tag data. As depicted in FIG. 3, process 300 depicts steps performed by automated extraction tool 106 and may include additional steps not shown.

Automated extraction tool 106 analyzes the social content. The social content may be any text, images, links, hashtags, articles, videos, or other data which is produced by users or computers within a network. This content may also be the metadata associated with the previously listed content. An example of this is the various posts and links shared on sites such as Facebook or Instagram. The automated extraction tool 106 analyzes the social content or the underlying metadata associated with this content. In certain embodiments, the automated extraction tool 106 is set to analyze specific content based on predetermined user settings. In additional embodiments, automated extraction tool 106 analyzes destination Uniform Resource Locator (URL), content based on a link URL, an image URL, or text within the content. The user can further adjust many additional features of the logic performed by the automated extraction tool 106, including, but not limited to how to extract metadata from links, images, website destination URL, content, metadata from social content and can also customize how to turn that metadata into tags.

Automated extraction tool 106 enriches the social content. The automated extraction tool 106 takes the analyzed social content enriches the content to create a more useable set of data for the tag logic. The enrichment process takes the social content or the metadata associated with the social content and normalizes the content. Then the enrichment process extracts key words or tags from the normalized data based on the predetermined keywords or tags.

Automated extraction tool 106 performs the automation logic parameter analysis on the enriched social content. The tag logic process may be customized for each individual user or may be a predetermined process. The automation logic parameter analysis may be, but not limited to images, keywords, links, websites, platform specific, or 3$^{rd}$ party partner tags. Additional parameters may be used.

Example 1

Example of Website Tag

Posts on Facebook with a link to a website: Systems of the present invention may be used to pick up the post and auto tag the content according predefined logic set by a user, e.g., a customer.
Example of Social Content Metadata
Social Content ID: [unique id given by social network]
Social Platform: Facebook
Posted By: [Facebook Page ID]
Connection ID: [Unique Identifier for Account Connection]
Content: Visit my website at [insert link]
Content Type: Link
Link: [insert any link]
Story: none
Images: none
Video: none Example 2

Example of Tag Logic Parameters

Tag Name: Website OG Type Tag
Restrict to Social Network: None
Restrict to Connection IDs: None
Tag Type: Website
Restrict to Domain: None
Website Tag Type: Script
Script Tag: meta
Script Name: property
Script Value: og:type
Script ID: content
Default tag group: campaign
Restrict to Keywords: None
Entity Extraction: Off
Example of HTML element within website: <meta property="og:type" content="article">
Step 1:
System for automated social content tagging checks to make sure link matches the restricted links (if not none), social network matches the restricted social networks (if not none), and connection id matches the restricted connections (if not none). If matches, go to step 2.
Step 2:
System for automated social content tagging goes to the link destination's website HTML and looks for a script tag that <meta property="og:type" content=
Step 3:
System for automated social content tagging extracts what content is equal to (in this example, "article") and stores in tag array.
Step 4:
If entity extraction is on, each tag in the tag array is sent to a third-party engine that performs entity extraction and inserts the additional tags into tag array. If not, skip to step 5.
Step 5:
If restrict keywords is not empty, then each tag in the array must match a keyword in the restrict keywords array or it is deleted from the tag array.
Step 6:
The final tag array is then inserted into the campaign tag array and stored in a database.
Final Result:
campaign_tag: {"article"}
In certain embodiments, the automated extraction tool can identify the element <meta property="og:type" content="article"> and extract out article and convert into a tag. In particular embodiments, the automated logic parameters can be set to search for any script, variable, or array within a website's HTML and then specific elements may be extracted out. For example, this can be used to extract out title tags, article authors, product prices, product names, content descriptions, content tags set.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. An automated extraction tool comprising a non-transitory machine-readable medium having instructions stored thereon for execution by a processor to perform a method comprising the steps of:
    analyzing social content using a set of automation logic parameters (ALP) to identify metadata content by rules adopted for analysis of images, keywords, links, websites, platform specific information, and third party partners for creating one or more tags;
    extracting the identified metadata; and
    creating one or more tags from the extracted metadata using tag conversion rules,
such that one or more tags is automatically created based on the identified metadata.

2. The automated extraction tool of claim 1, wherein the method further comprises the step of collecting the social content to analyze.

3. The automated extraction tool of claim 1, wherein the automation logic parameters includes a filtering parameter.

4. The automated extraction tool of claim 1, wherein the automatic logic parameters are capable of modification.

5. The automated extraction tool of claim 1, wherein the social content is selected from the group consisting of a URL destination, a link, an image, text, and any combination thereof.

6. The automated extraction tool of claim 1, wherein the tag conversion rules for creating tags are capable of modification.

7. The automated extraction tool of claim 1, wherein the method further comprises the step of presenting an array of tags.

8. The automated extraction tool of claim 1, wherein the method further comprises the step of storing the extracted metadata on a second machine-readable medium.

9. The automated extraction tool of claim 1, wherein the method further comprises the step of storing on or more of the created tags on a third machine-readable medium.

10. The automated extraction tool of claim 1, wherein the method is iteratively performed, e.g., to account for updating social content.

11. The automated extraction tool of claim 1, wherein the automation logic parameters includes the step of normalization and enrichment of the social content.

12. The automated extraction tool of claim 1, wherein the machine-readable medium is selected from the group consisting of magnetic media, punched cards, paper tapes, optical disks, barcodes, magnetic ink characters, and solid state devices.

13. The automated extraction tool of claim 12, wherein the machine-readable medium is one or more network server disks.

14. A system for automated social content tagging comprising
an automated extraction tool of claim 1, and
a fourth machine-readable medium having instructions stored thereon for execution by a processor to perform a method comprising the step of: associating one or more tags obtained from the automated extraction tool with the original analyzed social content.

15. A method of automatically creating tags from social content comprising the steps of:
analyzing social content using a set of automation logic parameters (ALP) to identify metadata content by rules adopted for analysis of images, keywords, links, websites, platform specific information, and third party partners for creating one or more tags;
extracting the identified metadata; and
creating one or more tags from the extracted metadata using tag conversion rules,
such that one or more tags is automatically created based on the identified metadata.

16. The method of claim 15, wherein the method further comprises the step of collecting the social content to analyze.

17. The method of claim 15, wherein the social content is selected from the group consisting of a URL destination, a link, an image, text, and any combination thereof.

18. The method of claim 15, wherein the method further comprises the step of presenting an array of tags.

19. The method of claim 15, wherein the method further comprises the step of storing the extracted metadata on a second machine-readable medium.

20. The method of claim 15, wherein the method further comprises the step of storing on or more of the created tags on a third machine-readable medium.

21. The method of claim 15, wherein the automation logic parameters includes the step of normalization and enrichment of the social content.

22. The method of claim 15, wherein the method further comprises the step of associating one or more tags with the original analyzed social content.

* * * * *